(12) United States Patent
Sbiti et al.

(10) Patent No.: US 10,867,323 B2
(45) Date of Patent: Dec. 15, 2020

(54) SOCIAL MEDIA MERCHANDISING AND ADVERTISING PLATFORM

(71) Applicants: Yassine Sbiti, Atlanta, GA (US); Selah Omer, Atlanta, GA (US)

(72) Inventors: Yassine Sbiti, Atlanta, GA (US); Selah Omer, Atlanta, GA (US)

(*) Notice: Subject to any disclaimer, the term of this patent is extended or adjusted under 35 U.S.C. 154(b) by 99 days.

(21) Appl. No.: 14/559,062

(22) Filed: Dec. 3, 2014

(65) Prior Publication Data
US 2015/0154654 A1    Jun. 4, 2015

Related U.S. Application Data

(60) Provisional application No. 61/911,623, filed on Dec. 4, 2013.

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0274* (2013.01); *G06Q 30/0246* (2013.01); *G06Q 30/0277* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 9,535,577 B2 * | 1/2017 | Spirer | ........... | H04N 21/475 |
| 2012/0150598 A1 * | 6/2012 | Griggs | ........... | G06Q 30/06 705/14.16 |
| 2012/0190386 A1 * | 7/2012 | Anderson | ........... | G01S 19/14 455/456.3 |

(Continued)

FOREIGN PATENT DOCUMENTS

| | | | | |
|---|---|---|---|---|
| JP | 2008041014 A | * | 2/2008 | ........... G06Q 30/00 |
| JP | 2010287067 A | * | 12/2010 | ........... G06Q 30/00 |
| JP | 2011192104 A | * | 9/2011 | ........... G06Q 30/00 |

OTHER PUBLICATIONS

Affiliate Marketing. eMarketing: The Essential Guide to Online Marketing (Aug. 26, 2007). Retrieved online Jul. 31, 2020. https://saylordotorg.github.io/text_emarketing-the-essential-guide-to-online-marketing/s07-affiliate-marketing.html (Year: 2007).*

(Continued)

*Primary Examiner* — James A Reagan
(74) *Attorney, Agent, or Firm* — Bekiares Eliezer LLP

(57) ABSTRACT

Consistent with embodiments of the present invention, a social media merchandising and advertising platform may be provided. The platform may enable any third party website, page, or entity referred to herein as an "advertiser" to post interactive content on a publisher's website. The interactive content may comprise, for example, a customizable badge. The platform may enable the advertiser to create, customize, and deploy the badge for display and access on the publisher's specified domain. Moreover, the platform may enable the advertiser to provide the publisher with various specifications and elements to be integrated into a customized badge and, in turn, provide the customized badge to a publisher. Either the publisher or advertiser, individually or collectively, may then post the advertiser's badge to a website.

14 Claims, 14 Drawing Sheets

(56) References Cited

U.S. PATENT DOCUMENTS

| | | | | |
|---|---|---|---|---|
| 2012/0303425 | A1* | 11/2012 | Katzin | G06Q 20/32 |
| | | | | 705/14.4 |
| 2013/0143651 | A1* | 6/2013 | Harrison | H04N 21/4222 |
| | | | | 463/31 |
| 2013/0159081 | A1* | 6/2013 | Shastry | G06Q 20/20 |
| | | | | 705/14.23 |
| 2013/0173430 | A1* | 7/2013 | Benjamin | G06Q 30/0627 |
| | | | | 705/26.63 |

OTHER PUBLICATIONS

Patel, Neil. The Ultimate Guide to the New Google Analytics Social Reports. (Jun. 19, 2012). Retrieved online Jul. 31, 2020. https://neilpatel.com/blog/google-analytics-social-reports/ (Year: 2012).*

Lumen. Introduction to Social Media and Digital Marketing. (Dec. 22, 2012). Retrieved online Jul. 31, 2020. https://courses.lumenlearning.com/boundless-marketing/chapter/introduction-to-social-media-and-digital-marketing/. (Year: 2012).*

* cited by examiner ic patent 10,867,323 B2

SOCIAL MEDIA MERCHANDISING AND ADVERTISING PLATFORM

RELATED APPLICATION

Under provisions of 35 U.S.C. § 119(e), the Applicant claims the benefit of U.S. provisional application No. 61/911,623, filed Dec. 3, 2014, which is incorporated herein by reference.

It is intended that the referenced application may be applicable to the concepts and embodiments disclosed herein, even if such concepts and embodiments are disclosed in the referenced applications with different limitations and configurations and described using different examples and terminology.

BACKGROUND

Social network advertising, also social media targeting is a group of terms that are used to describe forms of online advertising that focus on social networking sites. One of the major benefits of advertising on a social networking site (e.g. Facebook) is that advertisers can take advantage of the users' demographic information and target their ads appropriately.

Social media targeting combines current targeting options (like geo-targeting, behavioral targeting, socio-psychographic targeting, etc.), to make detailed target group identification possible. With social media targeting, advertisements are distributed to users based on information gathered from target group profiles and users may share those advertisements through their social networks.

Social network advertising is not necessarily the same as social media advertising. Social media targeting is a method of optimizing social media advertising by using profile data to deliver advertisements directly to individual users. Social media targeting refers to the process of matching social network users to target groups that have been specified by the advertiser.

There is a need to expand the capabilities (e.g., social mediate targeted data and social network advertising) available to the social media platform to online advertisements published on platforms outside of the social media platform.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
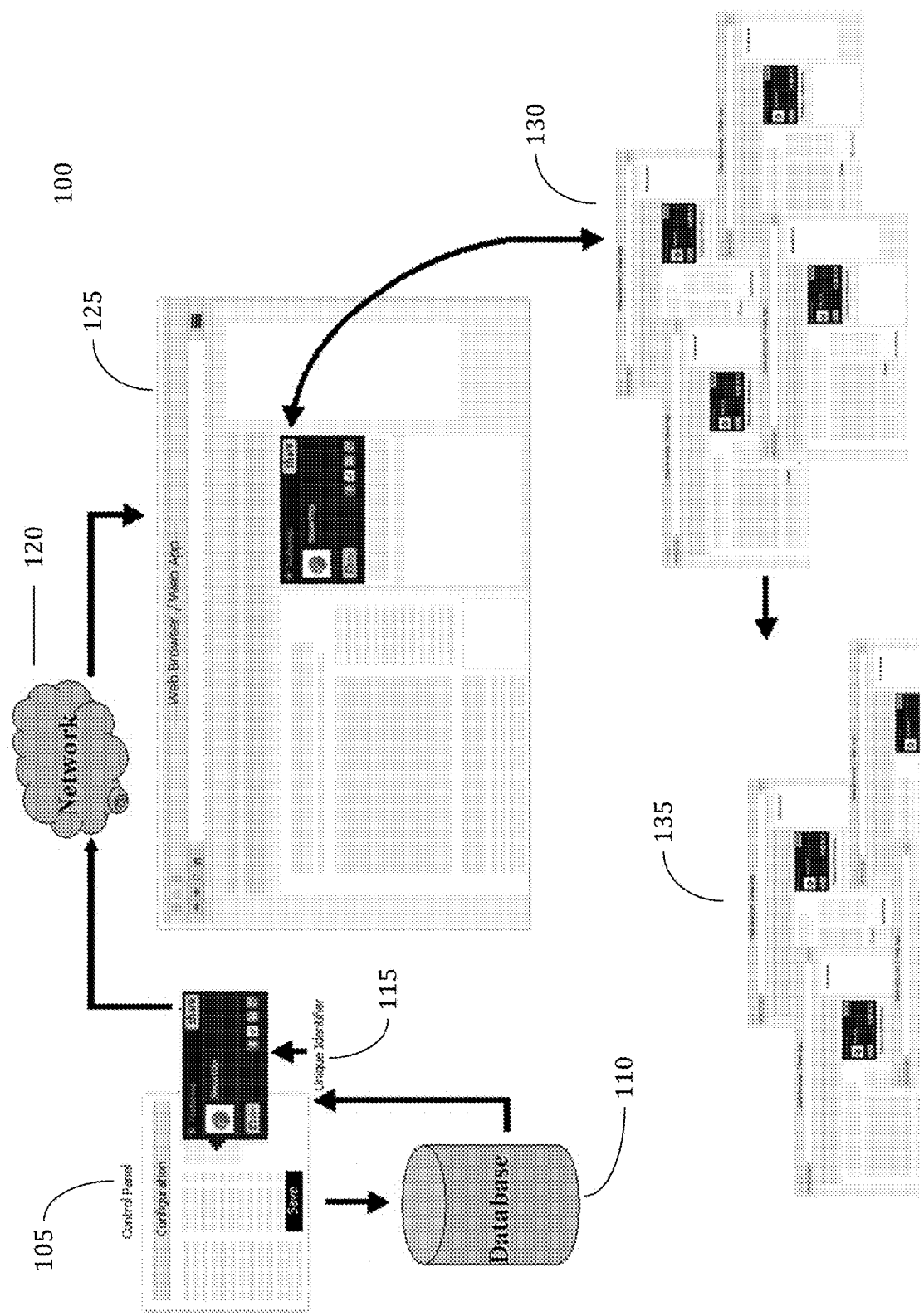
FIG. 1 illustrates a block diagram architecture of a platform consistent with embodiments of the present invention.

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

I. Platform Overview

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Consistent with embodiments of the present invention, a social media merchandising and advertising platform may be provided. The platform may enable any third party website, page, or entity referred to herein as an "advertiser" to post interactive content on a publisher's website. The interactive content may comprise, for example, a customizable badge. The platform may enable the advertiser to create, customize, and deploy the badge for display and access on the publisher's specified domain. Moreover, the platform may enable the advertiser to provide the publisher with various specifications and elements to be integrated into a customized badge and, in turn, provide the customized badge to a publisher. Either the publisher or advertiser, individually or collectively, may then post the advertiser's badge to a website.

Embodiments of the present invention may provide a set of user-interface (UI) controls with the badge. The UI controls may enable a user to interact with the advertiser, the publisher, or any other third parties while visiting a website to which the badge is published (e.g., the publisher's website). The UI controls may comprise, for example, a button, a URL, a text, a graphic, or any combination thereof. The controls may be configured to cause a communication of information and/or interaction between the user and the advertiser, the publisher, the platform, and/or any other third party application or website associated therewith.

Still consistent with embodiments of the present invention, the social media merchandising and advertising platform may be operative to perform a plurality of back-end operations associated with the publication of the badge. For example, the platform may track visitors of a website on to which the badge is published. The platform may be enabled to monitor visitor activity and trigger a set of operations in response to certain visitor activities. The operations may be specific to an advertiser associated with the badge, while integrating with, for example, the publisher's website and/or any other third party module available on to publisher's website.

Though terms such as 'advertiser,' 'publisher,' and 'distributor' are used throughout the present disclosure, it should be understood that these terms are used for explanatory and illustrative purposes only. An advertiser may comprise any individual or entity providing content to be displayed in a badge. Moreover, a publisher may comprise any individual or entity having an electronic document, forum, website, application, or any other form of virtual real-estate capable of displaying the badge. Finally, the term 'badge' is used to describe a combination of graphical and/or textual representations associated with, at least in part, the content provided by, for example, the advertiser.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1 is a block diagram depicting an embodiment of an architecture for providing the social media merchandising and advertising platform 100. The platform may be used by, for example, but not limited to, an advertiser, a publisher, and/or a distributor. As will be detailed in the "Badge Registration" section of this disclosure, the platform may comprise a control panel unique to the type of user accessing the platform.

For example, an advertiser may access the platform and be provided with a control panel 105 enabling the advertiser to register and customize at least one badge. A publisher may access the platform and be provided with a control panel to, for example, manage, monitor, and select badges for publications.

The control panel may be hosted by, for example, an administrator of the platform. The control panel may provide the administrator with a set of administrative controls for defining the features and properties of the badge. In this way, the administrator of the platform may retain control over the type of badge advertisers may register. In addition, the administrator of the platform may be enabled to monitor and maintain an approval process for each registered badge, thereby ensuring that the badge is acceptable for publication.

In some embodiments of the present invention, the administrator may be, for example, an advertising network or other type of distributor connecting advertisers and publishers. In this way, the platform may comprise a centralized interface enabling advertisers to register and customize badges, while allowing publishers to select and integrate badges onto a website.

Still consistent with embodiments of the present invention, the platform may be integrated with, for example, an administrative portal on a website. In these scenarios, the publisher of the website may access the administrative portal to exercise administrative control over the platform. The administrative portal may comprise an advertiser login and an administrator login. The advertiser login may provide an advertiser's control panel enabling the visitors of the website to register for a badge specific to the website publisher. Similarly, the administrator login may provide the publisher of the website an administrative control panel with administrative controls over the platform. In this way, the advertiser may be enabled to register and customize a badge for the publisher's website while the publisher may be enabled to define and monitor the properties and publication of the badge.

It should be understood that an advertiser, publisher, and/or distributor need not all be separate entities. Rather, an advertisers may also be the publisher, and, moreover, the publisher may also be a distributor across multiple channels of publication. Accordingly, a publisher may register for a badge and publish the badge on the publisher's own website. Similarly, a distributor may register for a badge and distribute the badge across many different channels of publication.

Consistent with embodiments of the present invention, once registered, each badge may be saved and stored in database 110 associated with the platform. As the platform may be accessible in a cloud-computing environment, the database may be likewise accessible in the cloud-computing environment. Consistent with embodiments of the present invention, a unique identifier 115 may be assigned to each registered badge in the database. In turn, the platform may use the unique identifier to associate the badge with, for example, the advertiser.

As will be detailed in the "Badge Registration" section of this disclosure, the platform may be operative to publish a badge on a website 125, via network 120, when the unique identifier associated with the badge is embedded within a uniform resource link (URL) to the website. In this way, the badge that is published to the website may be determined by the unique identifier embedded in the URL leading to the website. A visitor accessing the publisher's site through a URL comprising the embedded identifier would be displayed with a badge on the website associated with the unique identifier.

The badge may be positioned anywhere on the website or be overlaid, for example, as a frame or a pop-out tied to the website. Furthermore, in some embodiments, the badge may be present on each page 130 of the website if a visitor navigated to any page of the website through, for example, a URL comprising the embedded identifier or by the placement of a cookie that may ensure the availability of the badge on every page throughout the publisher's specified domains 135.

As will be detailed in the "Badge Integration" section of this disclosure, the unique identifier may be further integrated within the operation of the set of controls provided with each badge. Accordingly, whenever an interaction with the badge occurs through the badge controls, the interaction may be logged by the platform and associated with the unique identifier. Moreover, the platform may be operative to track interactions with any portion of a publishing website and associate those interactions with the unique identifier of the badge. In this way, the platform may perform operations in response to those interactions based, at least in part, the integrated unique identifier.

III. Badge Module

Figure 2:
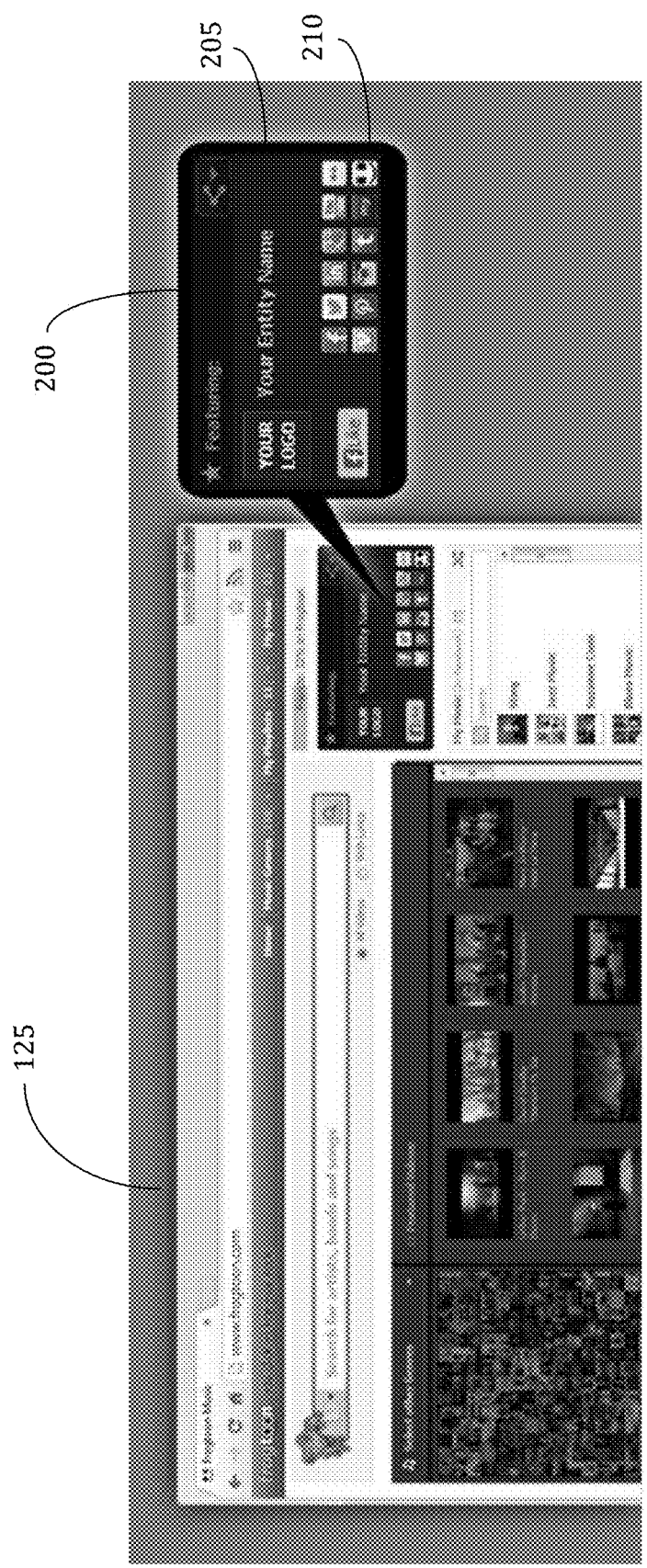
FIG. 2 illustrates a badge consistent with embodiments of the present invention.

Embodiments of the present invention may provide a unique badge for an advertiser. FIG. 2 illustrates one embodiment of a badge 200. A badge may be, for example, a combination of graphical and textual elements within a discrete graphical user interface (GUI) element. The GUI may comprise various graphical and textual representations including, but not limited to, for example, selectable buttons, URLs, embedded rich media content (i.e., html5, flash, audio, or video components). The badge may comprise a border encompassing a first portion associated with an advertiser, a second portion associated with various social media platforms, and a third portion associated with a publisher.

In accordance to embodiments of the present invention, the badge may comprise a first portion 205 for displaying a name and logo of the entity advertising the badge. The first portion may be selectable by a visitor of the website comprising the badge and, upon selection, route the visitor to a website associated with, or otherwise specified by, the advertiser. Moreover, in some embodiments, the visitor may presented with a dialog box comprising information associated with the entity. The dialog box may be displayed to the user upon a detection of a mouse hovering over the first portion of the badge.

A badge consistent with embodiments of the present invention may comprise a second portion 210 having a plurality of selectable controls. The selectable controls may enable a visitor to interact with various social media platforms associated with the advertiser. As will be detailed below, the advertiser, when registering for the badge, may specify a plurality of social media pages associated with the advertiser. In turn, the badge may comprise the plurality of selectable controls associated with functions provided by the corresponding social media platform. In this way, the advertiser may enable visitors to interact with the advertiser's various social media platforms through the publisher's website. In some embodiments, the selectable controls may be displayed within the badge, while in other embodiments, the selectable controls may be displayed in conjunction with the badge.

Still consistent with embodiments of the present invention, the badge may comprise a third portion having, for example, a message from the publisher and at least one sharing control for interacting with the publisher's site. The at least one sharing control may enable, upon selection, a visitor of the publisher's site to share the website in various forms, including, but not limited to, for example, emailing or messaging the website displaying the badge, posting the website on various social media platforms, inviting others to view or promote the website through the various social media platforms, and the like. The sharing options may be presented to the visitor of the website in, for example, a pop-up window or, alternatively, in a drop-down menu originating from the location of the sharing control.

Each time the website publishing the badge is shared through the at least one sharing control on the badge, the resulting URL created for sharing the website may comprise the unique identifier associated with the badge. In this way, visitors who are routed to the website through a URL generated by the sharing control on the badge may be presented with the same badge that was used to generate the URL leading to the site.

In various embodiments, the badge may be embodied in, for example, an application, including, but not limited to, for example, a web application, an android application, an iPhone application or any other programmable platform. In some embodiments, upon clicking of the badge on a publisher's website, a full-page version of the badge may be loaded. Alternatively, a larger version of the badge may be displayed within a frame of the publisher's website.

Figure 3:
FIG. 3 illustrates another embodiment of a badge consistent with embodiments of the present invention.
Figure 4:
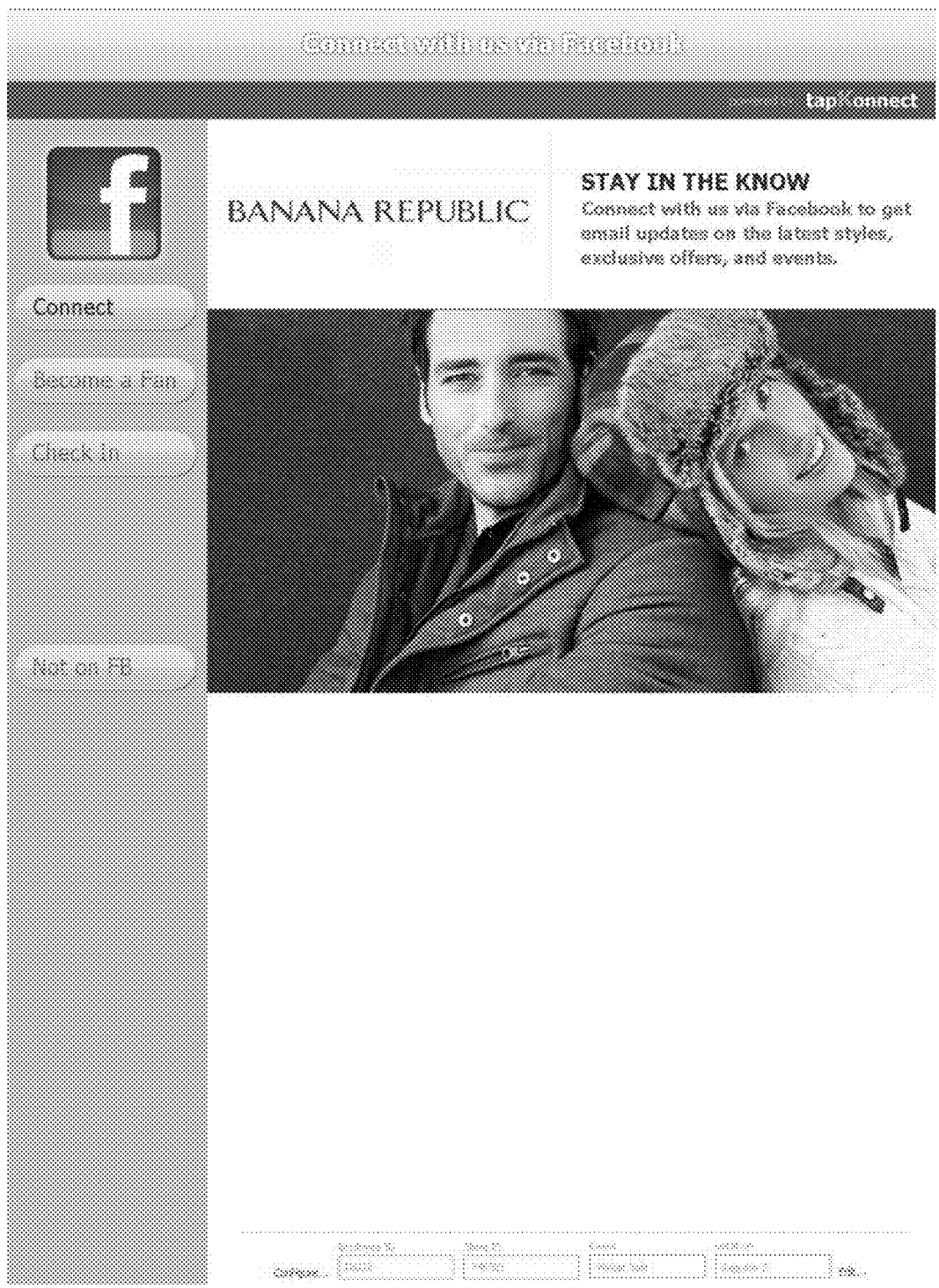
FIG. 4 illustrates yet another embodiment of a badge consistent with embodiments of the present invention.

In yet further embodiments, a user may be prompted to download and install the application associated with the badge onto their device. In this way, the badge may operate as a stand-alone application. FIGS. 3 and 4 illustrate embodiments of a full-page version 300 and application version 400 of the badge. Though not illustrated, the full-page and application versions of the badge may comprise additional areas for ad space that may be specified during the registration of the badge.

IV. Badge Registration

Figure 5A:
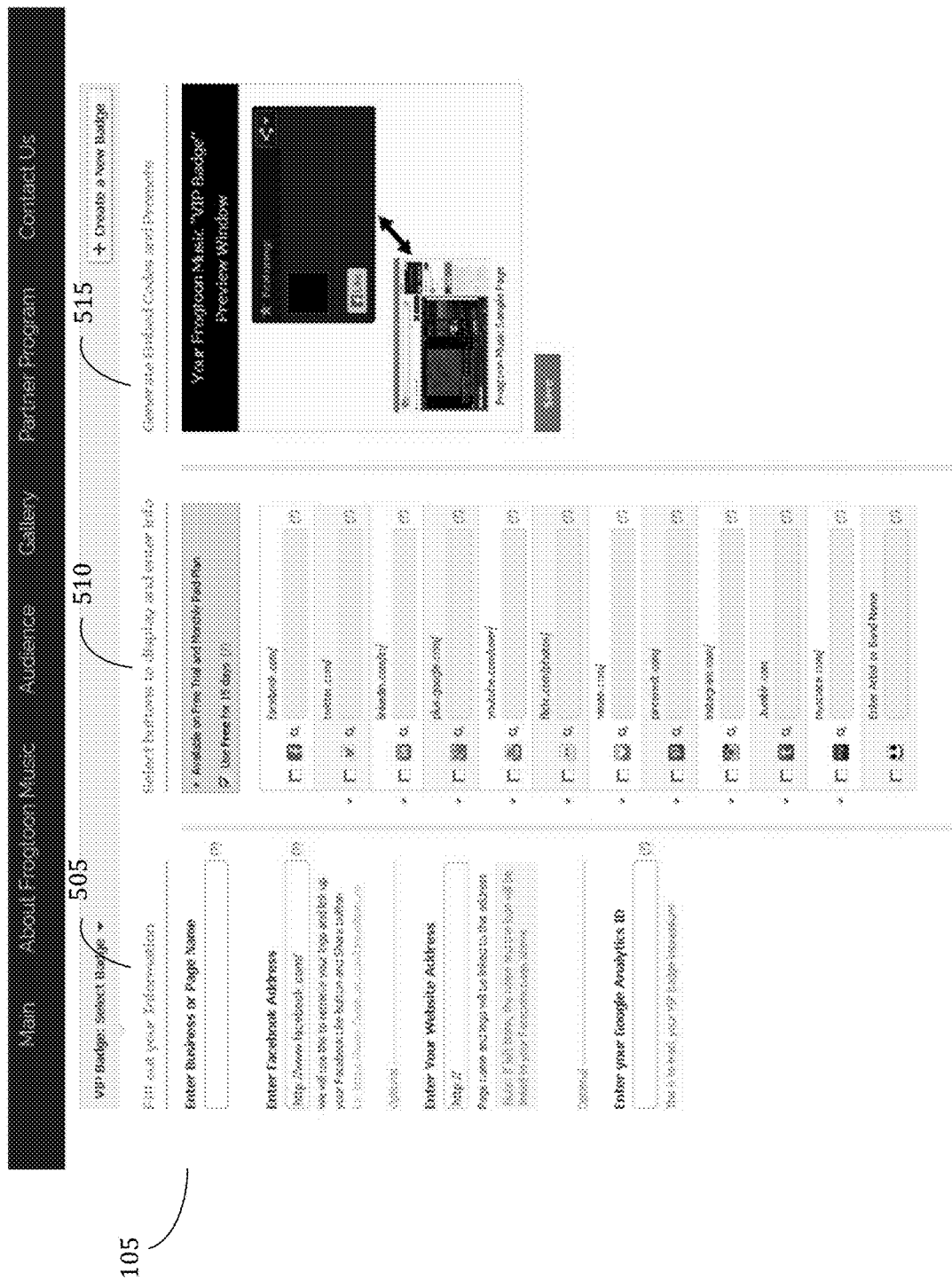
FIG. 5A illustrates a customization control panel consistent with embodiments of the present invention.
Figure 5B:
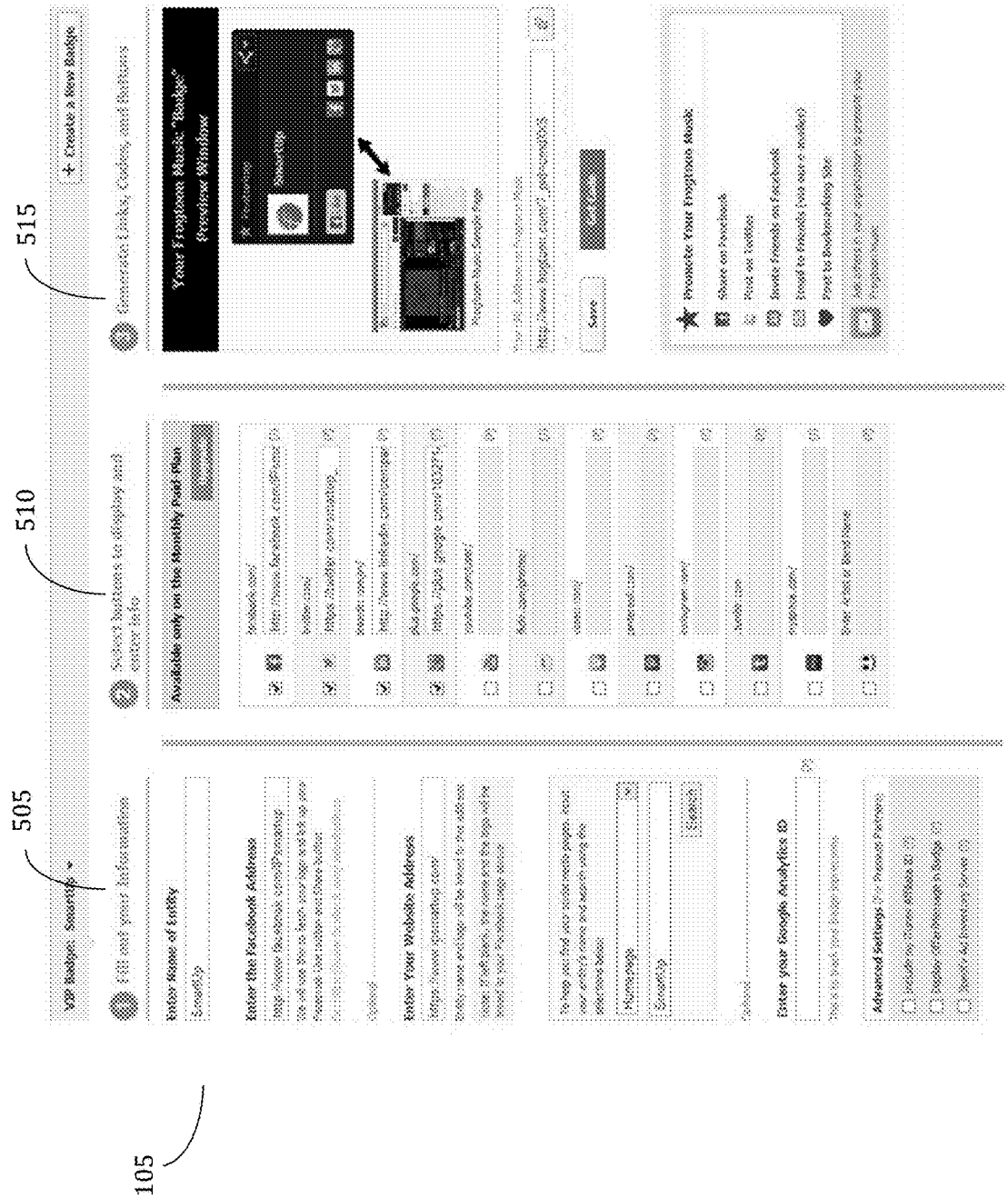
FIG. 5B illustrates another embodiment of the customization control panel consistent with embodiments of the present invention.
Figure 5C:
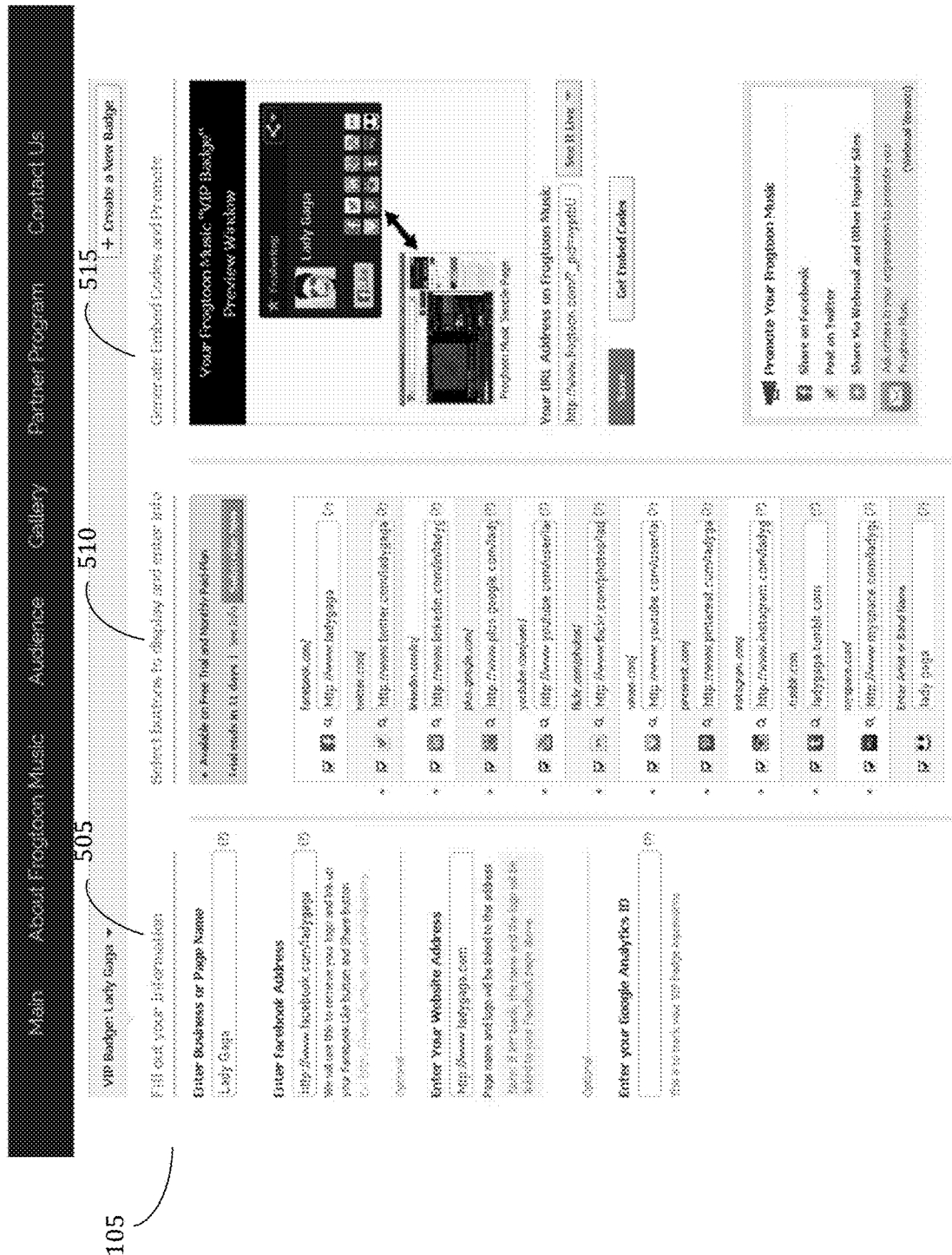
FIG. 5C illustrates yet another embodiment of the customization control panel consistent with embodiments of the present invention.

Embodiments of the present invention may provide a control panel for allowing an advertiser to register for a badge. FIGS. 5A-5C illustrates embodiments of a control panel accessible to advertisers of the platform. FIG. 5A illustrates an embodiment of the control panel 105 before any inputs are received, whereas FIGS. 5B and 5C illustrates embodiments of the control panel 105 after having received at least a portion of the inputs. The control panel may be hosted on a publisher's site, such as, for example, Frogtoon™. In this way, Frogtoon™ may act as the administrator of the control panel, specifying what the look, feel, and features may be provided to an advertiser accessing the control panel.

In some embodiments, the control panel may comprise three portions. A first portion 505 may register a badge, a second portion 510 may customize the controls associated with the badge, and the third portion 515 may provide controls the publication and distribution of the badge.

The first portion of an embodiment of the control panel may ask the advertiser to specify a name of the entity for which the badge is being registered, as well as a link to a website associated with that entity. Still consistent with embodiments of the present invention, the advertiser may be asked to specify a page for the entity on a third party social media platform such as, but not limited to, for example, Facebook. The first portion may further comprise search features used to assist an advertiser in specifying their third party social media content.

The platform may be operative to then access the third party social media platform and retrieve, from the specified page, information associated with the entity. The information retrieved may comprise, for example, a name, a logo, a description, as well as any other information accessible to the platform. The advertiser may be promoted with a request to grant the platform permission to access the aforementioned information from the third party social media platform.

Consistent with embodiments of the present invention, once the platform retrieves the third party information associated with the advertiser's entity, it may dynamically populate a preview of the badge displayed in the third portion of the control panel. The previewed badge may comprise, but not be limited to, for example, the name of the entity and a logo for the entity as retrieved from the third party social media page. The entity name and logo may be displayed on the first portion of the badge as specified in the "Badge Module" section above. Though reference is made to a third party social media page, it should be understood that embodiments of the present invention may comprise a platform operative to retrieve information stored in any database accessible to the platform.

Various embodiments of the present invention may enable the advertiser to select a level badge integration with a publisher's website. For example, the advertiser may opt to become a premium badge holder. As will be detailed in the "Badge Integration" section of this disclosure, premium badges may be integrated into the operation and publication of the publisher's website. The various levels of integration permissible to the advertiser may be configured by the administrator of the platform. In this way, the administrator may ensure that any integration level to which the advertiser subscribes may be accommodated by the publisher.

Figure 6:
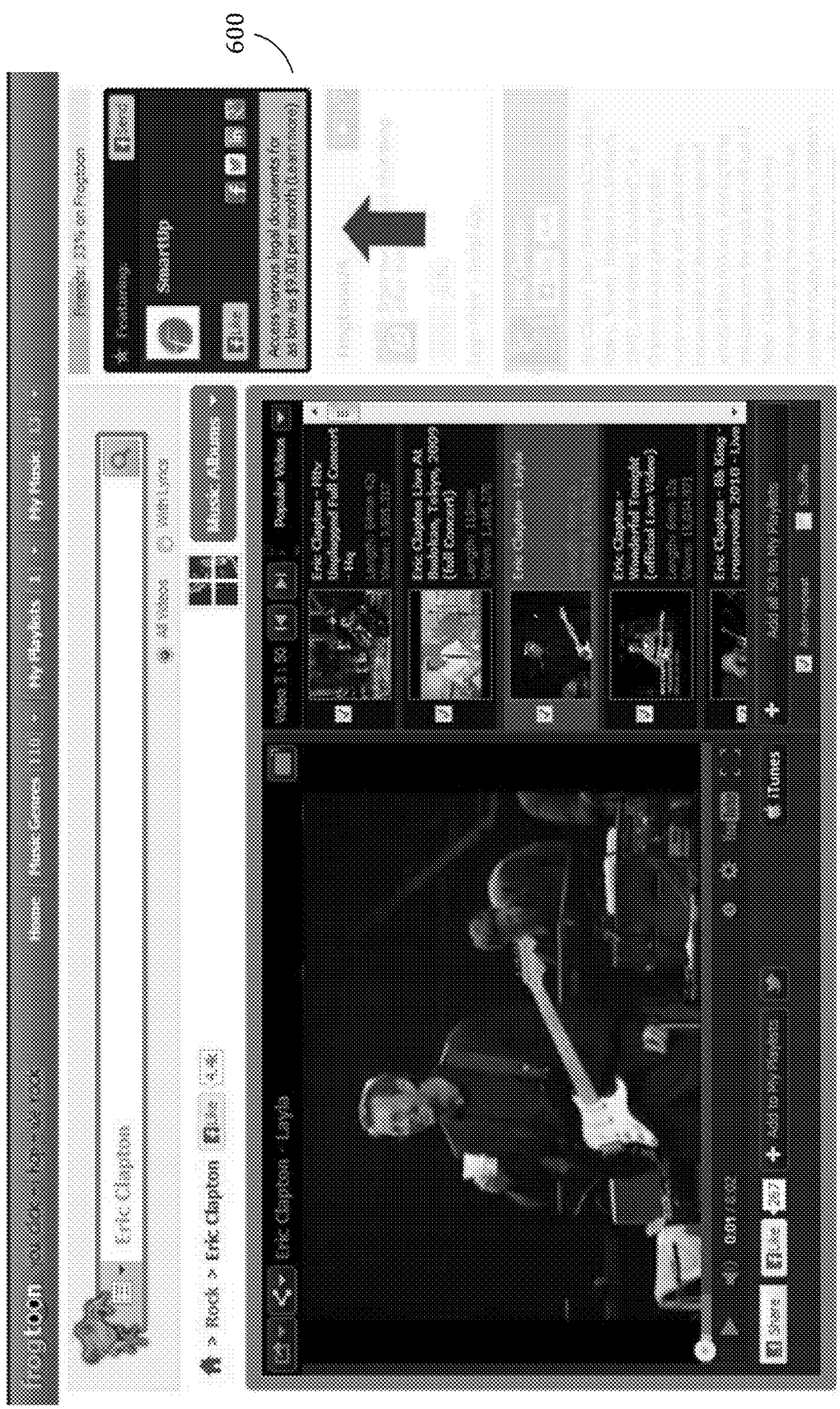
FIG. 6 illustrates an advertisement associated with a badge consistent with embodiments of the present invention.

For example, an advertiser may register his affiliate codes to share revenue on sales made on the publisher's site when the publisher's site displays the user's badge. In addition, the control panel may be expanded to provide a premium badge advertiser with an option to add a promotional message 600 that may be displayed in conjunction with the badge, as illustrated in FIG. 6. Moreover, the advertiser may register to expand his presence and association with the virtual ad real-estate on the publisher's site. For example, the advertiser may specify additional ads or a repository of ads that may be displayed in portions of the publisher's site designated for ad placement. In turn, the advertiser may share in the revenue generated when visitors click-thru the ads, so long as the advertiser's badge is displayed on the publisher's site at the time of the click-thru.

Embodiments of the control panel may comprise a second portion allowing an advertiser to affiliate various social media platforms with the badge. In order to affiliate the advertiser's social media platforms with the badge, some embodiments of the present invention may require the advertiser to upgrade to a premium badge level. The advertiser may be asked to specify a URL associated with each affiliated social media platform page. In response, the platform may dynamically preview and populate icons associated with each specified social media platform.

The icons may be displayed on the second portion of the badge as disclosed above in the "Badge Module" section of this disclosure. In this way, a visitor of the publisher's webpage may be enabled to interact with the advertiser, through the badge, on the various social media platforms specified by the advertiser. The extent to which social media platforms may be affiliated with the badge may be customizable by, for example, either the administrator of the platform or the registrant advertiser. For example, though Facebook, Twitter, Linked, Google+, YouTube, Flickr, Pinterest, Instagram, Tubmlr, and MySpace are available for affiliation, other social media platforms may be added to the control panel for integration.

Still consistent with embodiments of the present invention, the control panel may comprise a third portion for publishing the badge. The third portion may comprise a preview of the badge along with a URL comprising a unique identifier associated with the badge. The URL may be addressed to a publisher's website that is hosting the platform. However, when the platform is hosted by a distributor, or, for example, an advertising network, the advertiser may be able to select the publishers that are permitted to display the badge. In turn, the advertiser may be provided with the same unique identifier, but with various URLs to the various publishers selected by the advertiser.

Having the URLs with the advertiser's badge identifier embedded therein, the advertiser may serve as his own distributor. For example, the advertiser may distribute the URLs through a plurality of channels, thereby directing various visitors the publisher's site. When, in turn, the visitors arrive at the publisher's site through the URL, the visitors will view the publisher's site with the advertiser's badge displayed therein. In this way, the badge may serve as a cross-promotional tool, incentivizing both the advertiser and the distributor to distribute the embedded URL.

In various embodiments, the URL with the unique identifier may be generated upon a user's selection of the "Get Code" button, while in other embodiments the unique identifier may be generated upon, for example, a payment processing stage. The payment invoiced to the user may be calculated based on, at least in part, the integration options the advertiser selected during registration.

Figure 7:
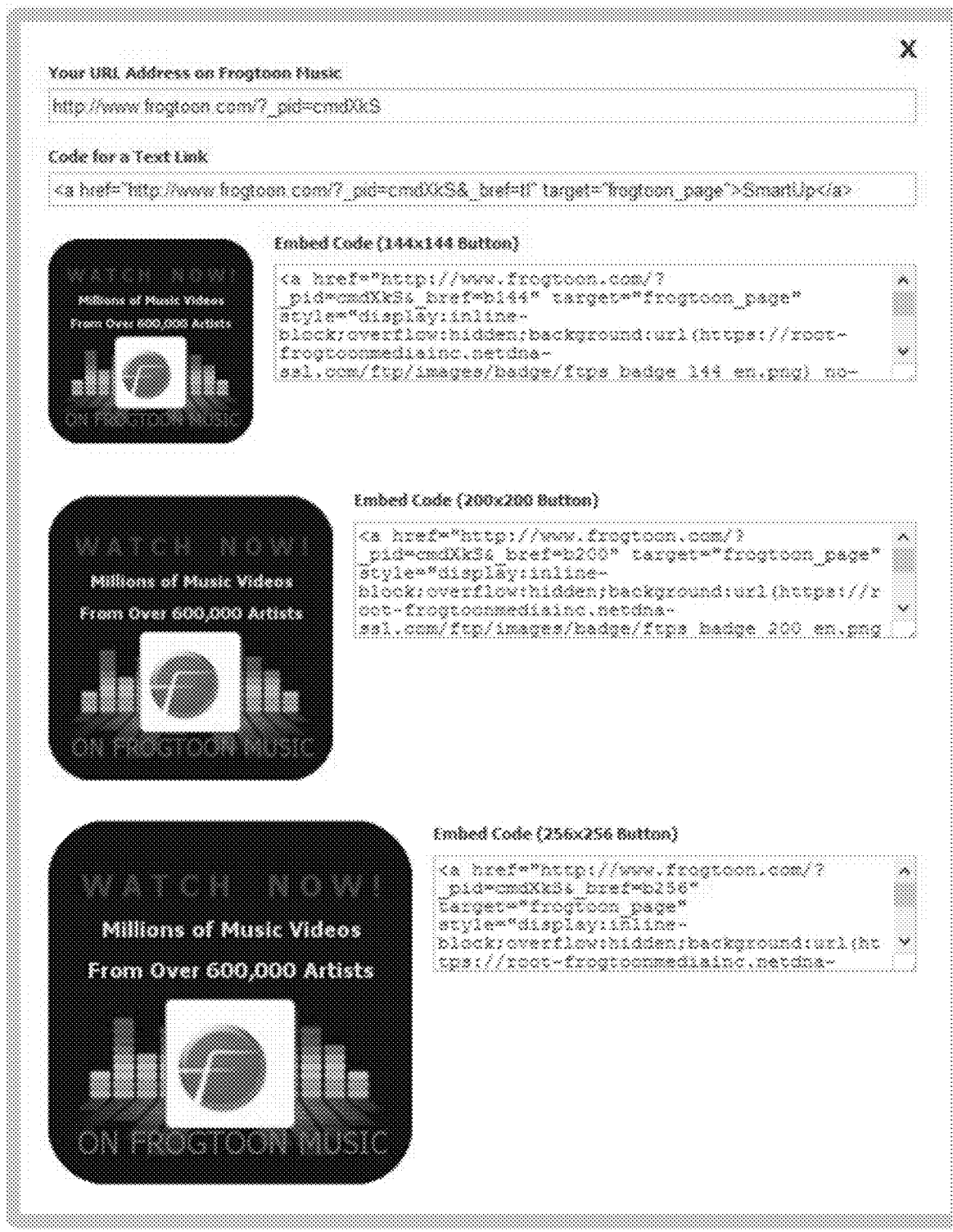
FIG. 7 illustrates a publication control panel consistent with embodiments of the present invention.

FIG. 7 illustrates one embodiment for providing an administrator of the platform with a snippet of code 700 that may be inserted into a website in order to publish the badge. The administrator may be provided with several options regarding the type of badge to be published, with corresponding snippets of code for each type. In addition, the administrator may be provided with additional controls that may enable, for example, a customization of a size for each badge publication.

Embodiments of the present invention may further provide a control panel for facilitating the registration of publishers and/or distributors of registered badges. Those control panel give control over publication, as well as control over advertiser control panel customization features. For example, in various embodiments, each platform administrator may be provided with a degree of customization as to what features a badge may comprise, as well as the level of integration the badge may have with the administrator's platform. In this way, the administrator may ensure that each badge registered is compatible with the publishing forums available to the platform.

Consistent with embodiments of the present invention, each badge configured by an advertiser may be seamlessly and dynamically updated. For example, an advertiser may add, remove, update and/or otherwise modify any of the information, controls, and settings associated with each badge. Upon receiving such updates, the platform may be configured to update the badge without any change to the unique identifier associated with the badge. In this way, neither the advertiser nor the publisher need to make further changes in any of the infrastructure associated with badge distribution and publication.

In further embodiments, some badge modifications made by an advertiser may be dynamically applied to each badge associated with the advertiser. By way of non-limiting example, an advertiser may update, through the control panel, the advertiser's Facebook page. In turn, the platform may dynamically push this update across all badges without further action by the user. Moreover, as mentioned above, the unique identifiers may remain unchanged for each badge, thereby eliminating any corresponding action for the advertisers, distributers, and the publishers in the maintenance, distribution, and publication of the badges. Although the aforementioned is made with reference to an advertiser's modification, the same seamless and dynamic update may apply when badge changes are performed by any party have administrative privileges to the badge.

V. Badge Integration

Figure 8:
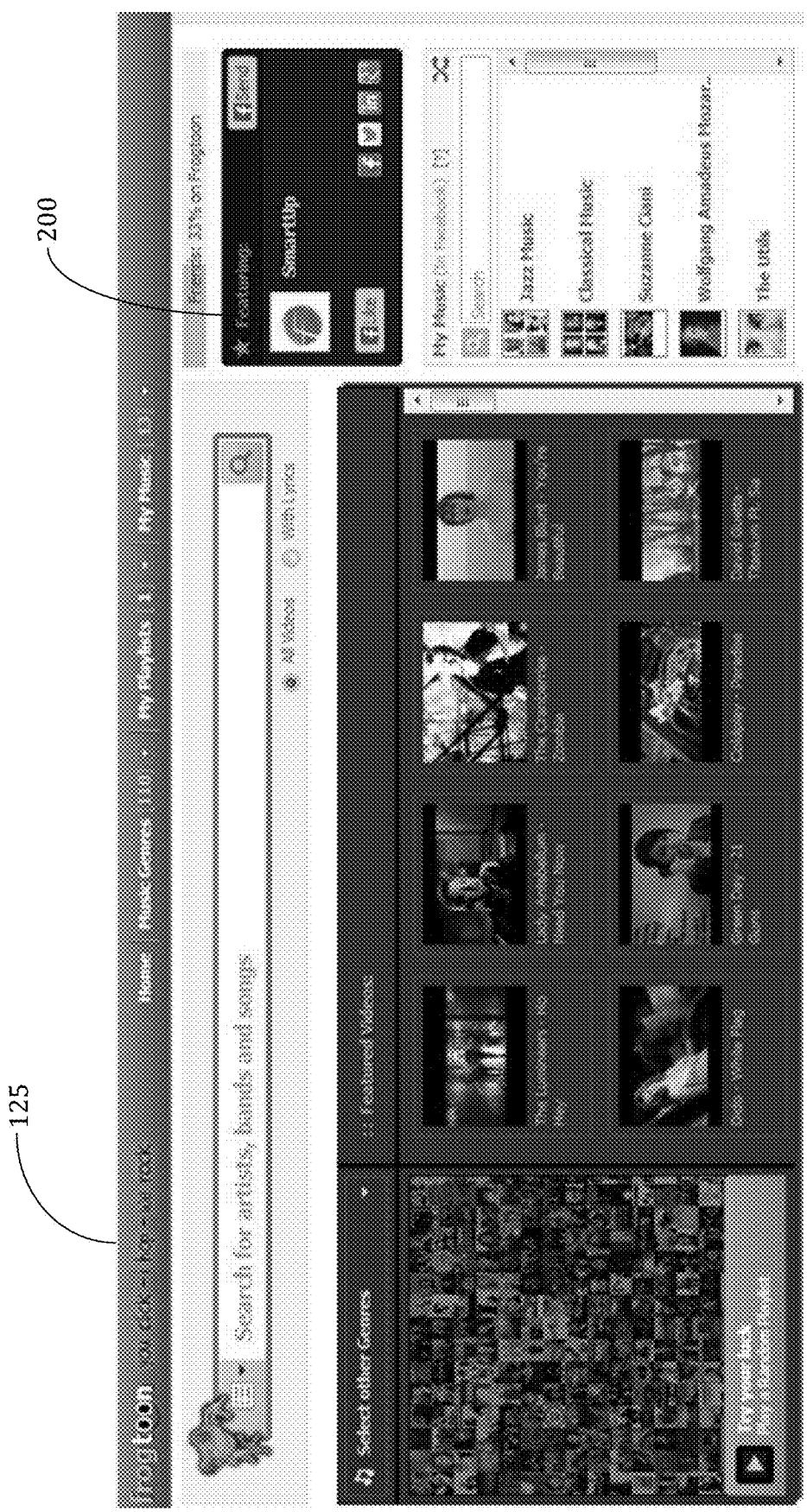
FIG. 8 illustrates a published badge consistent with embodiments of the present invention.

FIG. 8 illustrates an embodiment of a badge 200 published on a website 125. Having the badge published to the website, the platform may facilitate various cross-promotional concepts enabled by the badge. For instance, as mentioned above, visitors to a website displaying the badge may use a sharing control of the badge to share the website. In the process of distribution, the sharing control embeds the unique identifier associated with the badge into a shared URL. In turn, when any visitor accessing the website through the URL is displayed with the badge baring the control that generated the shared URL.

In this way, the advertiser or the page's visitors may be incentivized to share the publisher's page, as the advertiser's badge would be displayed on the page when using the embedded URL to share the page. Moreover, publishers may be incentivized to allocate a portion of their virtual-real estate to the advertiser's badge knowing that it may, in turn, incentivize the advertiser to attract the advertiser's user base to publisher's site.

Still consistent with embodiments of the present invention, the platform may enable the advertiser and the publisher to monetize from the publication of the badge. As mentioned above, the advertiser may register for a premium badge integration level. The premium badge integration level may comprise a plurality of additional options for integrating the advertiser's badge into the publisher's website.

Figure 9:
FIG. 9 illustrates an electronic commerce integration consistent with embodiments of the present invention.

For example, as illustrated in FIG. 9, a publisher may offer the sale of various third party products and/or services 300 on the publisher's website. The publisher may have an affiliate code with the third party selling those products in services. In certain embodiments of the present invention, the publisher may offer to replace the publisher's own affiliate with an advertiser's affiliate code as provided during badge registration. Accordingly, when the platform detects that a transaction is made on the publisher's website, it may associate the transaction with the unique identifier tied to the badge.

Figure 10:
FIG. 10 illustrates an ad-sharing integration consistent with embodiments of the present invention.

As another example, and as illustrated in FIG. 10, the premium badge integration level may enable the advertiser to share in ad revenue through the publisher's website. For example, the platform may track a click-thru rate of the ads on the publisher's site, and associate the click-thru rate with the unique identifier of the badge. Furthermore, the platform may integrate the advertiser's own ad network into the publisher's website. For example, the publisher's website may comprise a plurality of locations for ad placement 1010. Through the control panel, the advertiser may specify particular ads or a repository of ads that may be advertised on the publisher's website. In turn, the platform may access those specified ads, place in the publisher's ad locations, and monitor the click-thru rates associated with the ads. In this way, the platform may enable the advertiser to extend the advertiser's own ad network to the publisher's site while enabling the publisher and advertiser to share-in the resultant ad revenue.

Consistent with embodiments of the present invention, an administrator portal may provide an administrator with a control panel to monitor various data and statics aggregated by the platform. As previously explained, the administrator of the platform may be, for example, but not limited to, an advertiser, a publisher, or a distributor. The data may be associated with the unique identifier of each badge. In this way, an administrator of the platform may intelligible track and monitor the usage of each badge on each website the badge is published on.

The administrative control panel may enable the administrator to define editable properties associated with the badge and the integration of the badge on a corresponding publisher's website. By way of non-limiting example, the administrator may add and/or remove various integration options for a badge to ensure, for example, compatible of the badge with its corresponding publisher's website. The administrative portal may further provide demographical information associated with the various visitors to website, categorized by, for example, the unique identifier used to access the website. In general, the administrative platform of the portal may enable the administrator may further define, monitor, and control the extent and rules associated with the publication, integration, and electronic commerce associated with each badge.

VI. Platform Operation

Figure 11:
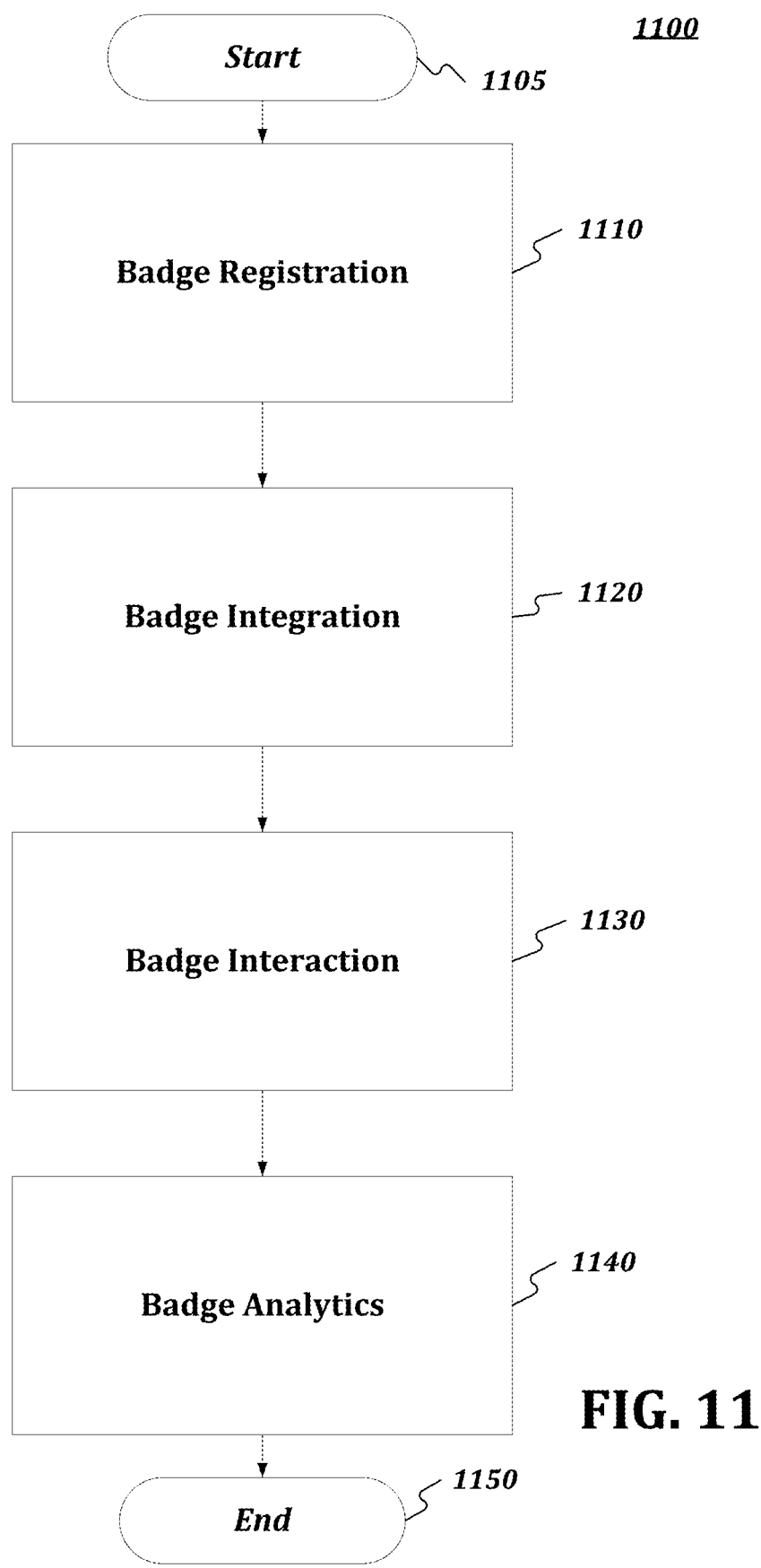
FIG. 11 is a flow chart illustrating on embodiment of a method for providing the present invention.

FIG. 11 is a flow chart setting forth the general stages involved in a method 1100 consistent with an embodiment of the disclosure for providing the platform of the present disclosure. Method 1100 may be implemented using a computing device 1200 as described in more detail below with respect to FIG. 12.

Although method 1100 has been described to be performed by computing device 1200, it should be understood that, in some embodiments, different operations may be performed by different networked elements in operative communication with computing device 1200. For example, server 110 and/or computing device 1200 may be employed in the performance of some or all of the stages in method 1100. Moreover, server 110 may be configured much like computing device 1200 and, in some instances, be one in the same embodiment.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 1100 will be described in greater detail below.

Method 1100 may begin at starting block 1105 and proceed to stage 1110 where computing device 1200 may register a badge or receive a badge registration. The registration may be facilitated through a control panel as described above. During the registration processing, computing device 1200 may receive a plurality of user inputs. One of such inputs may include, for example, a link to a third-party social media platform (e.g., Facebook). Once the link is received by computing device 1200, computing device 1200 may access the link to retrieve information associated with a plurality of the other user inputs to be entered during the registration process. Information inputted by a user and received by computing device 1200 may include, but not be limited to, for example, a website, analytics ID (e.g., visitor tracking), and affiliate codes (e.g., revenue sharing) associated with the user (e.g., advertiser).

In addition, the registration process may prompt the user to input links to the user's social media platforms. Inputs by the user in this portion may cause the badge to display social media icons with which viewers of the badge may interact. Once the registration process is complete, the user may be provided with a snippet of code comprising a unique identifier. The snipped of code may be inserted into a publishers website to cause a display of the registered badge.

From stage 1110, method 1100 may advance to stage 1120 where computing device 1200 may integrate the badge or receive a badge integration. Badge integration may comprise a publisher inserting the snippet of code into a website. The snippet of code may cause a visitor of the website to view the badge on the website. Accordingly, computing device 1200 may be configured to load the badge onto the publisher's website each time a viewer accesses the publisher's website.

In various embodiments, a viewer may access the publisher's website with a unique identifier embedded into the URL used to access the website. In this case, computing device 1200 may load, on the publisher's website, based on the unique identifier embedded into the URL.

Method 1100 may continue to stage 1130 where computing device 1200 may receive badge interaction. For example, as mentioned above, the advertiser, during badge registration, may have specified a plurality of social media platforms with which the badge may be associated. Each social media platform may comprise an icon. The icon may be configured to enable a user to share the publisher's website via the corresponding social media platform. During the sharing process, computing device 1200 may be configured to embed the unique identifier associated with the badge into the hyperlink shared via the corresponding social media platform. In this way, when other viewers access the publishers website via the hyperlink shared through social media, the badge used to share the website is loaded by computing device 1200 (as detailed in stage 1120).

Method 1100 may proceed to stage 1140 where computing device 1200 may provide badge analytics. For example, having the snippet of code embedded on the publisher's website may enable computing device 1200 to access data associated with the viewer accessing the website. In this way, computing device 1200 may be enabled to provided analytics data on the viewers of the website. Moreover, as mentioned above, analytics may include tracking ad-revenue and affiliate revenue sharing on the publisher's site as detailed above.

VII. Platform Architecture

The platform of the present disclosure may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform may be hosted on a centralized server, such as, for example, a cloud computing service. Although method 1100 has been described to be performed by a computing device 1200, it should be understood that, in some embodiments, different operations may be performed by different networked elements in operative communication with computing device 1200.

Embodiments of the present disclosure may comprise a system having a memory storage and a processing unit. The processing unit coupled to the memory storage, wherein the processing unit is configured to perform the stages of method 1100.

In addition, the processing unit and memory storage may be configured for: receiving a plurality of inputs from a user; creating a graphical user interface (GUI) element based on the plurality of inputs form the user; associating a unique identifier with the GUI element; causing a display of the GUI element on a website when the unique identifier associated with the GUI element is embedded within a uniform resource locator (URL) used to access the website.

Receiving the plurality of inputs may comprises receiving at least one of the following inputs: a name associated with the user, a website associated with the user, and a location of at least one social media platform associated with the user.

Creating the GUI element based on the plurality of inputs from the user may comprise retrieving information associated with the user based on the at least one social media platform associated with the user.

Creating the GUI element based on the plurality of inputs from the user may comprise including, within the GUI element, at least one hyperlink to the at least one social media platform associated with the user.

The processing unit may further be operative for embedding a hyperlink within the GUI element, the hyperlink enabling a visitor of the website to, upon selection, share the website through at least one third party platform; receiving, from the visitor of the website, a selection of the hyperlink; displaying a plurality of sharing options; receiving a selection of at least one of the sharing options; and sharing the URL of the website having the unique identifier embedded therein.

Receiving the plurality of inputs from the user may comprise receiving information associated with an e-commerce platform tied to the user. In such embodiments, the processing unit may be further configured for: detecting a visitor activity on the website, wherein the visitor activity is associated with the e-commerce platform; and determining that the visitor has at least one of the following: accessed the website through the URL comprising the unique identifier, and a cookie comprising the unique identifier; retrieving the e-commerce platform information tied to the user associated with the unique identifier; and sharing in a revenue generated by the visitor activity on the e-commerce platform.

Receiving the plurality of inputs from the user may comprise receiving at least one of the following: a textual advertisement to be displayed in conjunction with the GUI element; a graphical advertisement to be displayed in conjunction with the GUI element; and a server comprising at least one advertisement to be displayed in conjunction with the GUI element.

In such embodiments, the processing unit may be further configured for: detecting a visitor activity on the website, wherein the visitor activity is associated with advertisement; and determining that the visitor has at least one of the following: accessed the website through the URL comprising the unique identifier, and a cookie comprising the unique identifier; sharing in a revenue generated by the visitor activity associated with the advertisement.

In such embodiments, the processing unit may be further configured for: receiving a modification to at least one of the plurality of inputs; and modifying the GUI element based on the modification to the at least one input of the plurality of inputs used to create the GUI element.

Modifying the GUI element based on the modification to the at least one input of the plurality of inputs may comprise maintaining the same unique identifier associated with the GUI element. In such embodiments, the processing unit may be further configured for: determining that at least one additional GUI element has been created for the user; and modifying the at least one additional GUI element based on the modification to the at least one input of the plurality of inputs used to create the at least one additional GUI element, Modifying the at least one additional GUI element based on the modification to the at least one input of the plurality of inputs may comprise maintaining the same unique identifier associated with the at least one additional GUI element.

Figure 12:
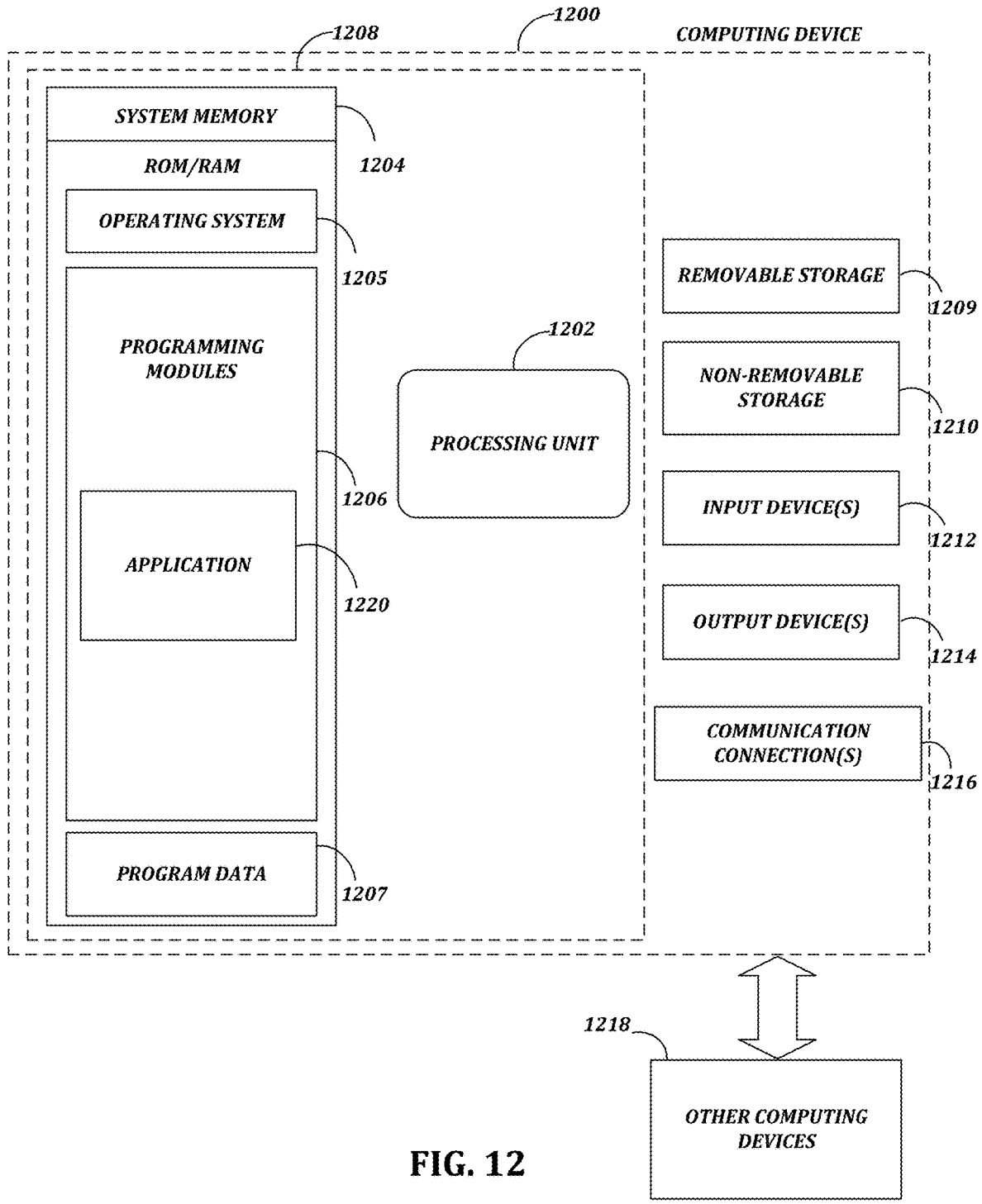
FIG. 12 is a block diagram of a computing device operative to perform the method of FIG. 11.

FIG. 12 is a block diagram of a system including computing device 1200. Consistent with an embodiment of the disclosure, the aforementioned memory storage and processing unit may be implemented in a computing device, such as computing device 1200 of FIG. 12. Any suitable combination of hardware, software, or firmware may be used to implement the memory storage and processing unit. For example, the memory storage and processing unit may be implemented with computing device 1200 or any of other computing devices 1218, in combination with computing device 1200. The aforementioned system, device, and processors are examples and other systems, devices, and processors may comprise the aforementioned memory storage and processing unit, consistent with embodiments of the disclosure.

With reference to FIG. 12, a system consistent with an embodiment of the disclosure may include a computing device, such as computing device 1200. In a basic configuration, computing device 1200 may include at least one processing unit 1202 and a system memory 1204. Depending on the configuration and type of computing device, system memory 1204 may comprise, but is not limited to, volatile (e.g. random access memory (RAM)), non-volatile (e.g. read-only memory (ROM)), flash memory, or any combination. System memory 1204 may include operating system 1205, one or more programming modules 1206, and may include a program data 1207. Operating system 1205, for example, may be suitable for controlling computing device 1200's operation. In one embodiment, programming modules 1206 may include control panel application 1220. Furthermore, embodiments of the disclosure may be practiced in conjunction with a graphics library, other operating systems, or any other application program and is not limited to any particular application or system. This basic configuration is illustrated in FIG. 12 by those components within a dashed line 1208.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210. Computer storage media may include volatile and nonvolatile, removable and non-removable media implemented in any method or technology for storage of information, such as computer readable instructions, data structures, program modules, or other data. System memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1200. Any such computer storage media may be part of device 1200. Computing device 1200 may also have input device(s) 1212 such as a keyboard, a mouse, a pen, a sound input device, a touch input device, etc. Output device(s) 1214 such as a display, speakers, a printer, etc. may also be included. The aforementioned devices are examples and others may be used.

Computing device 1200 may also contain a communication connection 1216 that may allow device 1200 to communicate with other computing devices 1218, such as over a network in a distributed computing environment, for example, an intranet or the Internet. Communication connection 1216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1204, including operating system 1205. While executing on processing unit 1202, programming modules 1206 (e.g., control panel application 1220) may perform processes including, for example, one or more of method 1100's stages as described above. The aforementioned process is an example, and processing unit 1202 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method comprising:
   receiving a plurality of inputs from a user, wherein receiving the plurality of inputs comprises:
   receiving at least one affiliate code corresponding to the user and at least one e-commerce platform, and
   receiving at least one of the following:
   a name associated with the user,
   a website associated with the user, and
   a location of at least one social media platform associated with the user;
   creating a graphical user interface (GUI) element associated with the user based on the plurality of inputs from the user;
   associating a unique identifier with the GUI element,
   providing a set of computer-readable instructions which, when executed, are configured to cause a display, on a computing device, of the GUI element on at least one webpage, wherein the display of the GUI element is caused by at least one of the following:
   the at least one webpage being accessed by a uniform resource locator (URL) comprising the unique identifier, and
   the computing device accessing the at least one webpage comprising a tracking element associated with the unique identifier;
   tracking an activity of the computing device as the computing device navigates from the at least one webpage, wherein the at least one webpage is associated with the e-commerce platform and is configured to execute the set of computer-readable instructions to display the GUI element;
   receiving a request to share the at least one webpage, wherein receiving a request comprises receiving an indication of a selection of a sharing element within the GUI,
   providing, in response to the request, a resulting URL comprising the unique identifier embedded in the resulting URL,
   receiving an indication of a subsequent computing device accessing the at least one webpage through the resulting URL, and
   tracking of at least one purchase, performed by the subsequent computing device, within the webpage comprising the GUI element; and
   calculating a revenue sharing scheme between the e-commerce platform and the user associated with the GUI element based on, at least in part, the at least one affiliate code associated with the user and the activity of the computing device on the at least one webpage.

2. The method of claim 1, wherein creating the GUI element based on the plurality of inputs from the user comprises retrieving information associated with the user based on the at least one social media platform associated with the user.

3. The method of claim 2, wherein creating the GUI element based on the plurality of inputs from the user comprises:

creating a user selectable element associated with the user, enabling the user to share through a third-party platform; and embedding within the GUI element, at least one hyperlink to the at least one social media platform associated with the user.

4. The method of claim 1, further comprising embedding the sharing element within the GUI element, the sharing element enabling a first visitor of the at least one webpage to, upon selection, share the at least one webpage a current webpage displaying the GUI element through the at least one third party platform.

5. The method of claim 4, further comprising:
receiving an indication of access to the at least one webpage by the subsequent computing device; and cause a display of the GUI element to a second visitor associated with the subsequent computing device.

6. The method of claim 1, further comprising tracking activity associated with the second subsequent computing device.

7. The method of claim 1, wherein receiving the plurality of inputs from the user comprises receiving information associated with the at least one e-commerce platform affiliated with the user.

8. The method of claim 1, wherein receiving the plurality of inputs from the user comprises receiving at least one of the following:
a textual advertisement to be displayed in conjunction with the GUI element;
a graphical advertisement to be displayed in conjunction with the GUI element; and
a server comprising at least one advertisement to be displayed in conjunction with the GUI element.

9. The method of claim 1, further comprising:
receiving a modification to at least one input of the plurality of inputs; and
modifying the GUI element based on the modification to the at least one input of the plurality of inputs used to create the GUI element,
wherein modifying the GUI element based on the modification to the at least one input of the plurality of inputs comprises maintaining a same unique identifier associated with the GUI element.

10. The method of claim 9, further comprising:
determining that at least one additional GUI element has been created for the user; and
modifying the at least one additional GUI element based on the modification to the at least one input of the plurality of inputs used to create the at least one additional GUI element,
wherein modifying the at least one additional GUI element based on the modification to the at least one input of the plurality of inputs comprises maintaining the same unique identifier associated with the at least one additional GUI element.

11. The method of claim 1, wherein tracking the activity further comprises tracking the activity on the at least one webpage displaying the GUI element, wherein the tracked activity is associated with an advertisement; and
sharing in a revenue generated in association with the at least one webpage by the tracked with the user associated with the GUI element.

12. A system comprising:
a memory storage; and
a processing unit couple coupled to the memory storage, wherein the processing unit is configured to:
receive a plurality of inputs from a user, the plurality of inputs from a user comprising at least one of the following:
a name associated with the user,
a website associated with the user, and
a location of at least one social media platform associated with the user,
wherein at least one of the plurality of inputs is associated with at least one affiliate code associated with the user and at least one e-commerce platform,
approve the at least one affiliate code corresponding to the user and the at least one e-commerce platform;
create a graphical user interface (GUI) element associated with the user based on the plurality of inputs from the user,
associate a unique identifier with the GUI element, and
provide a set of computer-readable instructions which, when executed, are configured to:
track at least one computing device loading at least one web page when the at least one computing device has been determined to access to the at least one web page through a URL comprising the unique identifier, cause, on the at least one computing device, a display of the GUI element associated with the unique identifier as the at least one computing device is tracked on a current web page associated with the set of computer-readable instructions, and
track an activity of the at least one computing device as the computing device navigates from the at least one webpage, wherein the at least one webpage is associated with the e-commerce platform and is configured to execute the set of computer-readable instructions to display the GUI element;
receive a request to share the at least one webpage wherein the request comprises an indication of a selection of a sharing element within the GUI,
provide, in response to the request, a resulting URL comprising the unique identifier embedded in the resulting URL,
receive an indication of a subsequent computing device accessing the at least one webpage through the resulting URL, and
track at least one purchase, performed by the subsequent computing device, within the webpage comprising the GUI element; and
calculate a revenue sharing scheme between the e-commerce platform and the user associated with the GUI element based on, at least in part, the at least one affiliate code associated with the user and the activity of the computing device on the at least one webpage.

13. The system of claim 12, wherein the processing unit is further configured to embed the sharing element within the GUI element, the sharing element enabling a first visitor of the at least one web page to, upon selection, share the at least one web page through at least one third party platform.

14. The system of claim 13, wherein the processing unit is further configured to:
receive an indication of access to the at least one webpage by the subsequent computing device; and cause a display of the GUI element to a second visitor associated with the subsequent computing device.

* * * * *